July 4, 1967   E. HERION   3,329,159
PILOT-OPERATED SLIDE VALVE WITH POSITION INDICATOR
Filed June 15, 1964
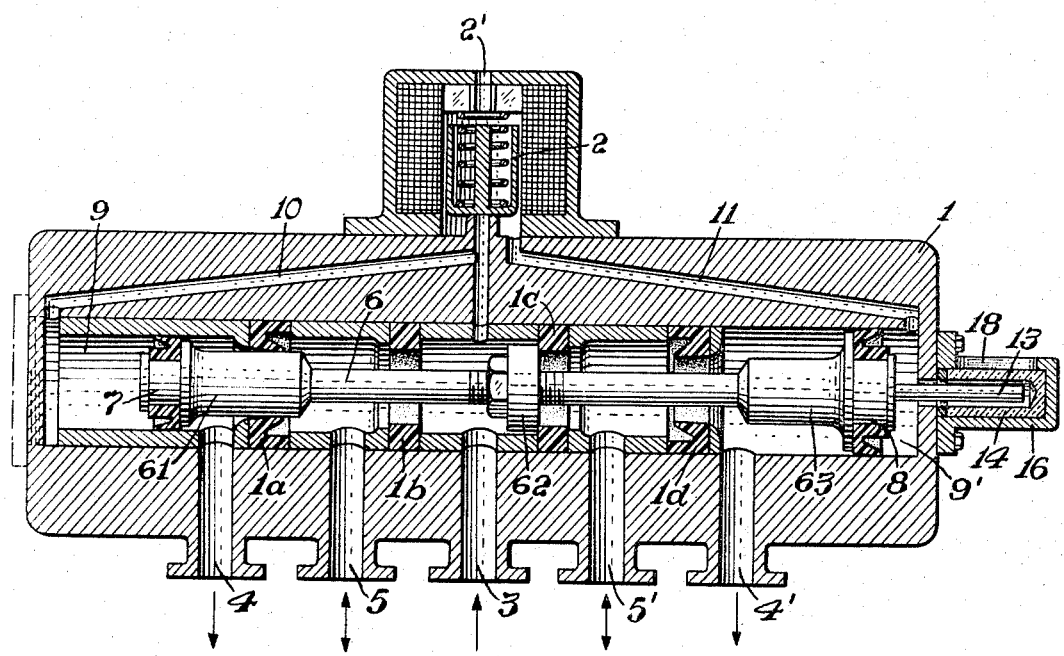
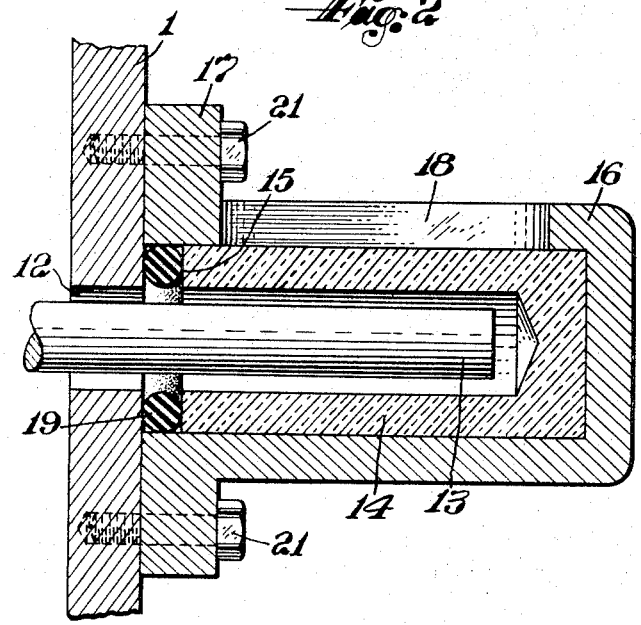
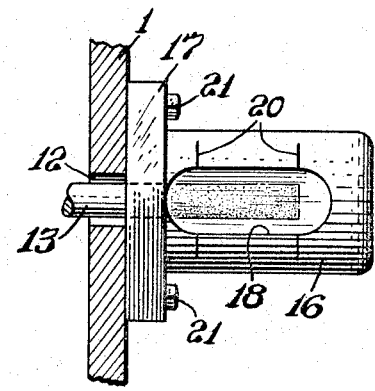
INVENTOR.
Erich Herion
BY Richard Ernst
Ag't 3,329,159
PILOT-OPERATED SLIDE VALVE WITH POSITION INDICATOR
Erich Herion, 22 Distlerstrasse, Stuttgart-Frauenkopf, Germany
Filed June 15, 1964, Ser. No. 375,108
Claims priority, application Germany, July 5, 1963, H 49,650
4 Claims. (Cl. 137—556)

This invention relates to pilot operated slide valves, and more particularly to a slide valve equipped with an indicator which shows the position of the movable valve member.

Pilot operated slide valves are commonly employed for controlling hydraulic equipment, such as double-acting hydraulic cylinders. One of the principal advantages of such valves in high-pressure hydraulic circuits is the absence of external seals between movable elements. It is inherently impossible for such a valve to lose hydraulic fluid through a leaking packing between the valve shell and a member which is arranged for movement through the packing outward and inward of the shell.

It is desirable in many applications to provide a direct indication of valve position. While conclusions as to the position of the movable valve member may be drawn from measurement of pressure or flow rate in conduits connected to the valve, such an indirect method requires relatively complex equipment and is subject to error in the event of failure of such equipment. An indication of valve position also cannot be obtained unless pressure fluid is available.

The object of the invention is the provision of a pilot operated valve which provides a direct and foolproof indication of the valve position without loss of the afore-described principal advantage of a pilot-operated valve.

Another object is the provision of a valve having a position indicator which is simple, rugged, and not subject to wear or failure under any reasonable operating conditions.

Yet another object is the provision of a position indicator which does not interfere with the operation of the valve and does not consume energy for its operation.

With these and other objects in view, the invention provides the valve slide of an otherwise conventional slide valve with an indicator member which moves axially through an end wall of the valve sleeve when the valve slide moves axially in the sleeve between its several operating positions. The end wall has an aperture of sufficient size to permit free passage of the indicator member. A sight member of light permeable material is sealed to an outer face of the afore-mentioned end wall in such a manner that an orifice of the sight member is sealingly connected to the aperture of the end wall, and the indicator member moves in and out of the sight member during valve operation.

Other features and many of the attendant advantages of this invention will be readily appreciated as the same becomes better understood by reference to the following detailed description when considered in connection with the accompanying drawing in which:

FIG. 1 shows a valve of the invention in side-elevational section on the axis of the valve sleeve;
FIG. 2 is an enlarged view of a detail of FIG. 1; and
FIG. 3 illustrates the device of FIG. 2 partly in side elevation, and partly in axial section on a scale intermediate between those of FIGS. 1 and 2.

Referring now to the drawing in detail, and initially to FIG. 1, there is seen a slide valve whose working elements are contained within a sleeve 1 and are operated by means of a solenoid pilot valve 2 in a manner not novel in itself. The axial wall of the sleeve 1 has an inlet 3 for pressure-fluid which is normally connected to a pump. Two outlet openings 4, 4' in the sleeve wall are normally connected to a sump, and two controlled openings 5, 5' are normally in communication with the spaces in a hydraulic cylinder on either side of a double acting piston, as is conventional.

The openings 3, 4, 4', 5, 5' are axially spaced, and annular valve seats or seals 1a, 1b, 1c, 1d are arranged in the cylindrical cavity of the sleeve 1 between the openings. They cooperate with cylindrical sealing elements 61, 62, 63 fixedly mounted on a common stem 6 coaxial with the sleeve 1. The sealing elements 61, 63 respectively carry pistons 7 and 8 which axially define pressure chambers, 9, 9' with the radial end walls of the sleeve 1. The cross section of the piston 7 is substantially smaller than that of the piston 8. The chambers 9, 9' are connected to the pilot valve 2 by ducts 10, 11. The duct 10 permanently communicates with the pressure fluid inlet 3, and the duct 11 is at all times connected with a space in the solenoid valve 2 which is vented through a small opening 2'.

In the position of the solenoid valve 2 illustrated in FIG. 1, the chamber 9' is vented, and the pressure of the hydraulic fluid acting in the chamber 9 on the piston 7 holds the valve slide constituted by the stem 6 and the sealing elements 61, 62, 63 in a position in which the sealing element 61 is received in the annular seal 1a and blocks the outlet opening 4. The sealing element 62 is lifted from the valve seat 1b and engages the valve seat 1c to connect the controlled opening 5 to the pressure-fluid inlet 3, and to separate the controlled opening 5' from the pressure-fluid inlet. The sealing element 63 is withdrawn from the seal 1d and opens a path from the controlled opening 5' to the outlet opening 4'. One of the spaces in the afore-mentioned non-illustrated hydraulic cylinder is thus under fluid pressure, the other space is being drained to the sump.

When the solenoid valve 2 is energized, the ducts 10, 11 are connected, and the greater pressure of the fluid acting on the piston 8 moves the valve slide into a position in which the sealing element 63 is engaged in the seal 1d, the sealing element 62 abuts against the valve seat 1b, and the sealing element 61 is removed from the seal 1a. The controlled opening 5 is connected to the outlet 4, and the controlled opening 5' is connected to the pressure-fluid inlet 3.

The valve described so far and its operation are known. This invention is more particularly concerned with the device best seen in FIGS. 2 and 3, and with its cooperation with the known slide valve.

The piston 8 carries a coaxial cylindrical indicator rod 13 which extends axially outward of the cavity in the sleeve 1 through an aperture 12 in the radial end wall of the sleeve. A tube 14 of transparent, fluid-tight material has an orifice 15 aligned with the aperture 12 and is sealed to the outer face of the sleeve 1 by an annular gasket 19 which is a conventional O-ring. The outer end of the tube 14 is closed. A cap 16 holds the tube 14 to the sleeve 1. The cap 16 is approximately cup-shaped. It has a flange 17 which is attached to the radial end wall of the sleeve 1 by screws 21. An axial slot 18 in the cap 16 provides a sight opening through which the indicator rod 13 may be viewed. Index marks 20 are arranged on the cap 16 where the transverse end face of the rod 13 is normally located in the two operative positions of the valve slide, and the alignment of the rod face with one or the other index mark shows the position of the valve slide.

The bore of the tube 14 is greater than the cross section of the rod 13, and the rod is spaced from all internal walls of the tube 14 and of the aperture 12.

The length of the sight opening 18 is slightly greater than the stroke of the valve slide.

Although the indicator rod 13 moves into and out of the sleeve cavity, a packing between the rod and the radial end face of the sleeve is not necessary. Actually there is ample clearance between the rod and the walls of the aperture 12 so that friction between the rod and the sleeve does not hamper slide movement. The only sealing connection needed and provided for the indicator arrangement is at the orifice 15 of the sight tube 14, and is formed by the O-ring 19. The cap 16 merely provides the pressure for holding the tube against the O-ring. A seal between the flange 17 and the valve sleeve 1 is neither necessary nor even desirable.

It will be appreciated that the material of the tube 14 must be selected to meet operating requirements. Polymethylmethacrylate has been found excellent for use with certain types of hydraulic fluid, but glass, fused quartz, or other plastic or ceramic materials may be preferred under other conditions. It is not necessary that the tube 14 be fully transparent. A translucent tube is adequate if the free end of the rod has a color that differs sufficiently from that of the cap 16. A red surface coating on the rod 13 is preferred, and the cap 16 may be given another, contrasting color, such as green.

It is evident that the indicator arrangement of the invention is not subject to wear. There is no frictional engagement of moving parts. Malfunctioning of the device is virtually impossible, and it does not influence valve operation.

It should be understood, of course, that the foregoing disclosure relates only to a preferred embodiment of the invention, and that it is intended to cover all changes and modifications of the example of the invention herein chosen for the purpose of the disclosure which do not constitute departures from the spirit and scope of the invention set forth in the appended claims.

What I claim is:
1. A slide valve comprising, in combination:
   (a) a valve sleeve having an axis,
      (1) said sleeve including an axial wall and an end wall transverse of said axis, said walls defining a cavity in said sleeve,
      (2) said axial wall being formed with a plurality of axially spaced openings, and said end wall being formed with an aperture therethrough, said opening and said aperture communicating with said cavity;
   (b) valve slide means axially movable in said cavity between two positions in which said valve slide means define respective paths in said cavity connecting one of said openings respectively with two other openings;
   (c) pressure fluid operated means in said cavity for moving said valve slide means between said positions thereof;
   (d) an indicator member mounted on said valve slide means for axial movement therewith, said indicator member projecting axially outward of said cavity through said aperture of said end wall in at least one position of said valve slide means;
   (e) a tube of light-permeable material integrally closed at one end and formed with an orifice at the other end, said tube having an axis parallel to the axis of said sleeve and being formed with a space extending axially inward of said orifice;
   (f) an annular gasket axially interposed between said orifice and a portion of said end wall outside said cavity for sealingly connecting said aperture with the space in said sight member.
      (1) said indicator member being spaced from said tube and from said end wall in said positions of said valve slide means; and
   (g) a substantially cup-shaped cap member conformingly receiving said tube, said cup-shaped member having a flange portion secured to said end wall in direct contact therewith,
      (1) said cap member being formed with a sight opening for viewing said indicator member through said tube in said one position of said valve slide means.
2. A valve as set forth in claim 1, further comprising cooperating index means on said cap member adjacent said sight opening and on said indicator member, said index means being alignable with each other during axial movement of said indicator membmer.
3. A valve as set forth in claim 1, wherein a portion of said indicator member that is viewed through said sight opening has a color different from the color of said cup-shaped member.
4. A valve as set forth in claim 1, wherein the axial length of said sight opening is at least equal to the axial spacing of the two positions of said valve slide means.

References Cited

UNITED STATES PATENTS

| | | | |
|---|---|---|---|
| 2,633,868 | 4/1953 | Berhoudar | 137—556 X |
| 2,919,590 | 1/1960 | Griswold | 137—556 X |
| 3,049,140 | 8/1962 | Thornhill et al. | 137—556 X |
| 3,142,315 | 7/1964 | Hennells | 137—625.6 |

M. CARY NELSON, *Primary Examiner.*

HENRY T. KLINKSIEK, *Examiner.*